Dec. 25, 1951 M. P. WILDER 2,579,772

METHOD OF MAKING AN IMAGE STORAGE SCREEN

Filed Oct. 17, 1949

INVENTOR.
MARSHALL P. WILDER

BY Ralph W. E. Bitner

ATTORNEY

Patented Dec. 25, 1951

2,579,772

UNITED STATES PATENT OFFICE 2,579,772

METHOD OF MAKING AN IMAGE STORAGE SCREEN

Marshall P. Wilder, Stamford, Conn., assignor to Remington Rand Inc., New York, N. Y., a corporation of Delaware Application October 17, 1949, Serial No. 121,679

4 Claims. (Cl. 117—33.2)

This invention relates to a photosensitive image storage screen for use in cathode ray picture tubes, and includes a method of manufacturing the screen. It has particular reference to screens which may be used to store a received television picture for a considerable length of time, for detailed examination or photographic recording. The screen herein disclosed may be used in any or all the applications described in copending application Serial No. 73,592, filed January 29, 1949, now Patent 2,550,316, issued April 24, 1951.

Several prior art devices have been used to retain or store a picture image. One such device uses a cathode ray television receiving tube with a screen made up of potassium chloride crystals. The action of the scanning cathode ray alters the light transmitting properties of the screen, and an image may be seen by transmitted light long after the cathode ray application. The image may be erased by heat.

Another prior art storage device (Krawinkle) employs a cathode ray scanning beam to charge a mosaic screen by direct contact. Discrete islands of insulating material are formed on a photosensitive conducting plate which is kept at a negative potential. The cathode ray beam, modulated by image values, scans the island mosaic, the electron speed being slow enough to deposit negative charges on the surface of the non-conducting islands in proportion to the black and white values of the image. After a short scanning operation the mosaic is evenly illuminated by an infra-red lamp and the electron emission of the base plate is then proportional, per unit area, to the charges on the islands. These photoelectrons are then focused on a fluorescent screen and may be viewed for an extended period.

Both the above mentioned prior art devices require a scanning operation by a cathode beam and the initial exposure time must be long enough to permit a full scanning operation. The above mentioned Krawinkle screen is opaque and must be observed from the electron gun side of the screen.

It is an object of this invention to provide an improved method of forming an image storage screen which avoids one or more of the disadvantages of prior art methods.

Another object of the invention is to reduce the cost of making storage screens by using a simple method of manufacture.

Another object of the invention is to increase the quality of stored images, by using a method which includes steps that can be easily and completely controlled.

One feature of the invention includes a method of making an image storage screen which comprises the following steps. A metallic screen is first coated with a thin film of antimony to provide a proper base for a cesium film to be applied later. Secondly, a thin continuous film of nitrocellulose is deposited on the antimony side of the screen. Third, an aluminum coating is applied on top of the nitrocellulose to provide a strong support and prevent breakage. Fourth, an insulating film of a suitable substance, such as calcium fluoride, is applied to the opposite side of the screen by evaporation. Fifth, the aluminum and nitrocellulose films are washed off by a solution of sodium hydroxide and water. Sixth, after mounting in a vacuum chamber, cesium is evaporated onto the antimony and after a suitable time and temperature cycle a photosensitive surface is obtained on the antimony base and discrete cesium drops are formed on the calcium fluoride surface.

The image storage screen may be conveniently mounted in a cathode ray picture tube where the cesium is applied and the screen heated. Several forms of final tube arrangements are shown in the above mentioned patent application, and all of these are suitable for the final process steps which complete the image storage screen.

For a better understanding of the present invention, together with other and further objects thereof, reference is made to the following description taken in connection with the accompanying drawings.

Figs. 4 to 8, inclusive, are cross sections of the storage screen showing the detailed steps during the method of making it.

Figures 1, 2, 3:
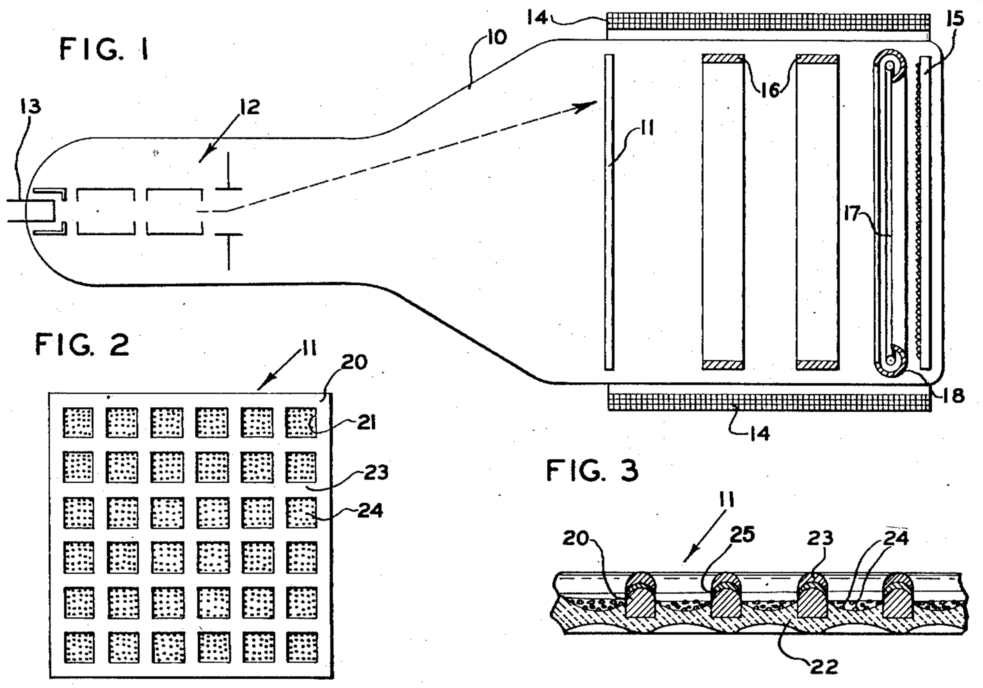
Fig. 1 is a cross sectional view (partly schematic) of the invention mounted in a cathode ray tube and illustrates the manner in which the last steps of the method are accomplished.
Fig. 2 is an elevation view of the completed image storage screen taken from the cesium side.
Fig. 3 is a cross section of the completed image storage screen enlarged to show the details of construction.

Referring now to Fig. 1, an evacuated envelope 10 is used to house a finished image storage screen 11 in conjunction with an electron gun assembly 12, a cathode 13, a focusing coil 14, and a fluorescent screen 15. Other focusing components such as electrostatic rings 16 may be used to complement the focusing action.

A shielded filament 17 is employed to evaporate cesium onto the screen 11 during the manufacturing process which will be described hereinafter. After the screen has been completed the filament 17 is used to illuminate the screen with infra-red radiation to operate it in the desired manner. A shield and reflector 18 is employed to keep the radiated light from striking the fluorescent screen 15.

The finished image storage screen 11 is shown in Figs. 2 and 3. It comprises a metallic support 20, generally of copper, with square cavities 21. A continuous barrier of non-conducting material, such as calcium fluoride 22, is deposited on one side of the screen surface. The other side of the screen comprises a film of cesium 23 on the conducting part of the screen and discrete drops of cesium 24 on the non-conducting areas.

Figure 4:
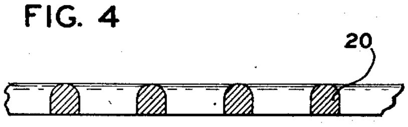
Figure 5:
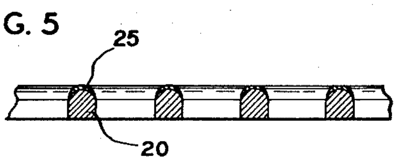
Figure 6:
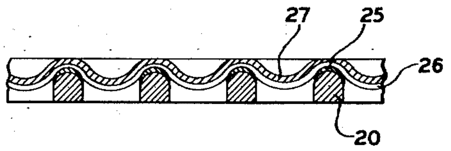
Figure 7:
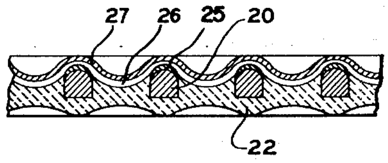
Figure 8:
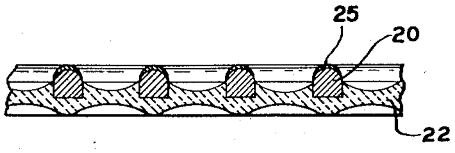

The method of manufacturing this type of screen is as follows:

A metallic screen, illustrated in Fig. 4, is used as the basis of the image storage screen. It is possible to use a metallic screen which has been made by interweaving fine wire, but such a screen suffers the disadvantage of not being flat and of having no common plane on which to focus an electron beam. The screen shown in Fig. 4 can be made by electrode deposition of copper on a ruled glass plate, such a process being well known in the art and described in several publications. The first step is illustrated in Fig. 5 and comprises the deposition of a thin film of antimony 25 applied to one side of the screen only. This antimony film is a necessary part of the photosensitive surface as well as a support for the cesium film to be deposited thereon later in the process. It is well known that cesium deposited on copper will not result in a sensitive photoelectric surface. The next step shown in Fig. 6 comprises the application of a film of nitrocellulose 26 placed over the entire screen on the antimony side. A very thin film is used, and because of its flexibility, the film is depressed in the open areas of the screen. The next step includes the deposition of a reinforcing layer 27 which may consist of any strong material placed in a position as indicated in Fig. 6, and is solely for the purpose of making the nitrocellulose film strong enough to keep its position and shape. It has been found that aluminum deposited on the nitrocellulose comprises a base which is strong enough to meet all the requirements and, in addition, can be removed with comparative ease after its function has been accomplished. The next step comprises the deposition of a considerable quantity of a non-conductor 22 applied to the screen on the under side thereof. For this purpose, calcium fluoride has been found to be a good material to use since it can be deposited in a vacuum, is non-conducting, and will withstand temperatures well above 500 degrees centigrade. The next step comprises the removal of the nitrocellulose film 26 and the aluminum supporting film 27. This can be done by simply washing the screen assembly with a solution of sodium hydroxide in water. After washing, the screen is then placed in the cathode ray tube envelope 10 in which it is to be used, and a thin film of cesium is deposited on the antimony film 25 and the intervening calcium fluoride surfaces. The method of doing this has already been described above in the description of Fig. 1, and is accomplished by coating the filament 17 with the right amount of cesium and then heating the filament with an outside source of current until all the cesium has been evaporated onto the surface of the screen 11. After this step in the process, the cesium film will be continuous and, therefore, conducting, and will unite all the non-conducting areas of calcium fluoride. To render these surfaces non-conducting, the entire tube is placed in an oven and brought to a temperature of approximately 120 degrees centigrade for a few seconds. Such a heat treatment will not change the cesium film on the antimony because a bond exists between the cesium and the antimony and the film remains equally distributed. On the areas between the conducting segments, however, the cesium has little tendency to wet the surface of the calcium fluoride. Therefore, when heated it breaks up into discrete tiny particles which become insulated from each other. This is the final form of the image storage screen and is illustrated in Fig. 3. When mounted in the tube 10, the insulated portion 22 is placed toward the electron gun 12 and the cesium surface is, therefore, facing the fluorescent screen 15. The action of this storage screen has already been described in the above mentioned patent application Serial No. 73,592, now Patent 2,550,316, and its various applications will not be described here.

The materials used to form the above described screen were selected because they have been found by experiment to be the best adaptable and easiest to work with. It is quite obvious that many other materials could be used without departing from the spirit of the invention. For example, instead of cesium deposited on antimony, many other combinations of photoelectric materials could be used. Cesium oxide deposited on a backing of silver oxide is one combination. Sodium, potassium, and any other photosensitive material might be used instead of the cesium. Also, the basic screen does not have to be made of copper, but might be made of antimony to start with and then the antimony film 25 would be unnecessary. In addition, the aluminum reinforcing film might be omitted entirely if a nitrocellulose film of sufficient thickness were used to provide the required strength and if great care were taken during the deposition of the non-conducting material. Instead of calcium fluoride, it will be obvious that any non-conducting material such as silicon monoxide (SiO) which can be deposited in the manner indicated and which will withstand a temperature of 150 degrees centigrade will be sufficient.

What is claimed is:

1. The method of making an image storage screen which includes the following steps; coating one side of the metal portions of a metallic screen with a thin film of antimony, depositing a continuous film of nitrocellulose onto the antimony side of the screen, depositing a reinforcing film of aluminum on the nitrocellulose, applying a continuous film of a non-conducting substance to the screen and the nitrocellulose film, removing the aluminum and nitrocellulose films by washing in a solution of sodium hydroxide and water, placing the screen in a container, reducing the pressure therein, heating cesium to evaporate it and deposit it on the antimony side of the screen to provide a thin photosensitive surface, and raising the temperature of the screen to form discrete cesium drops on the non-conducting surface.

2. The method of making an image storage screen which includes the following steps; coating one side of the metal portions of a metallic screen with a thin film of antimony, depositing a continuous film of flexible plastic onto the antimony side of the screen, depositing a continuous reinforcing film of aluminum on the flexible plastic, applying a continuous film of a non-conducting substance to the screen and the plastic film, removing the aluminum and the plastic film by washing in a solution of sodium hydroxide and water placing the screen in a container, reducing the pressure therein, heating cesium to evaporate it and deposit it on the antimony side of the screen to provide a thin photosensitive surface, and raising the temperature of the screen sufficiently to melt the cesium and form discrete cesium drops on the non-conducting surface.

3. The method of making an image storage screen which includes the following steps; coating one side of the metal portions of a metallic screen with a thin film of antimony, depositing a continuous film of flexible plastic onto the antimony side of the screen, depositing a continuous reinforcing film of aluminum on the flexible plastic, applying a continuous film of calcium fluoride to the screen and the plastic film, removing the aluminum and the plastic film by washing with a solution of sodium hydroxide and water, placing the screen in a container, reducing the pressure therein, heating an alkali metal to evaporate it and deposit it on the antimony side of the screen to provide a photosensitive surface, and raising the temperature of the screen sufficiently to melt the alkali metal and form discrete drops on the calcium fluoride surface.

4. The method of making an image storage screen which includes the following steps; coating one side of the metal portions of a copper screen with a film of antimony, depositing a preformed continuous film of nitrocellulose onto the antimony side of the screen, evaporating a reinforcing film of aluminum onto the nitrocellulose film, evaporating a film of calcium fluoride onto the copper side of the screen assembly, said calcium fluoride being thick enough to cover the depressions between the copper portions and present a continuous gas-tight barrier, removing the aluminum and nitrocellulose films by washing in a solution of sodium hydroxide and water, placing the screen in a container, reducing the pressure therein, heating cesium to evaporate it and deposit it on the antimony side of the screen to provide a photosensitive surface, and raising the temperature of the screen to a value which is sufficient to cause the cesium to react with the antimony to form a sensitive photo-electric surface and to form discrete drops on the calcium fluoride surface.

MARSHALL P. WILDER.

REFERENCES CITED

The following references are of record in the file of this patent:

UNITED STATES PATENTS

| Number | Name | Date |
|---|---|---|
| 2,118,186 | Farnsworth | May 24, 1938 |
| 2,162,808 | Gallup | June 20, 1939 |
| 2,244,720 | Massa et al. | June 10, 1941 |
| 2,495,042 | Wilder et al. | Jan. 17, 1950 |